Figure 1:
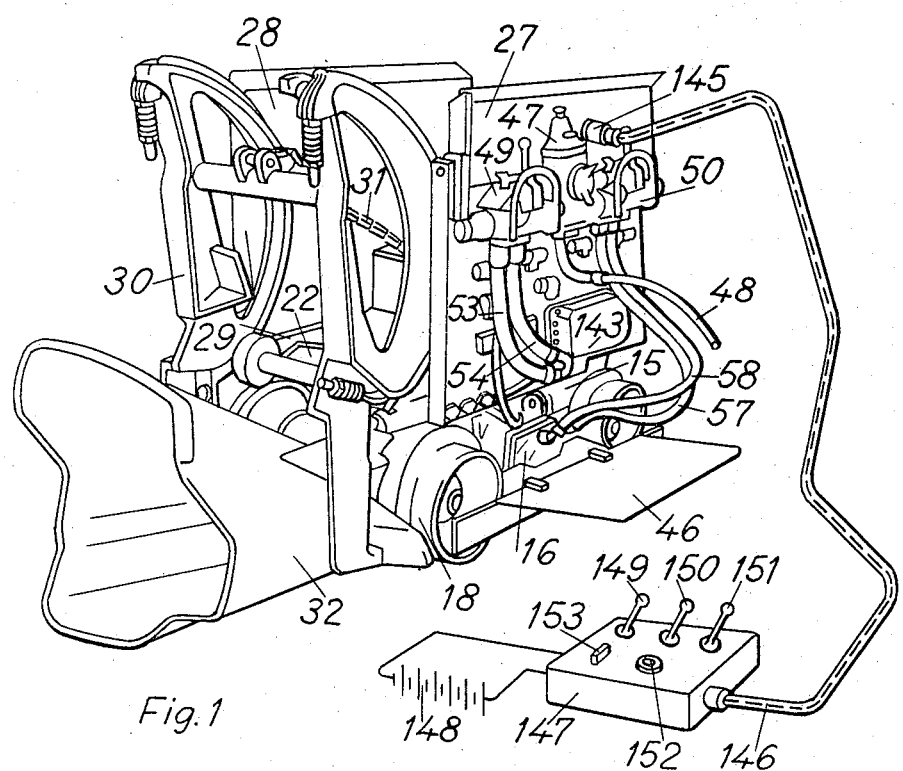

Aug. 15, 1967  L. V. PAHLSJÖ  3,335,881
REMOTELY CONTROLLED VEHICLES FOR PERFORMING MINING WORK
Filed April 13, 1965  6 Sheets-Sheet 1

LARS VILHELM PAHLSJO
INVENTOR.

BY ERIC Y. MUNSON,
Attorney

LARS VILHELM PAHLSJO
INVENTOR.

BY ERIC Y. MUNSON,
Attorney

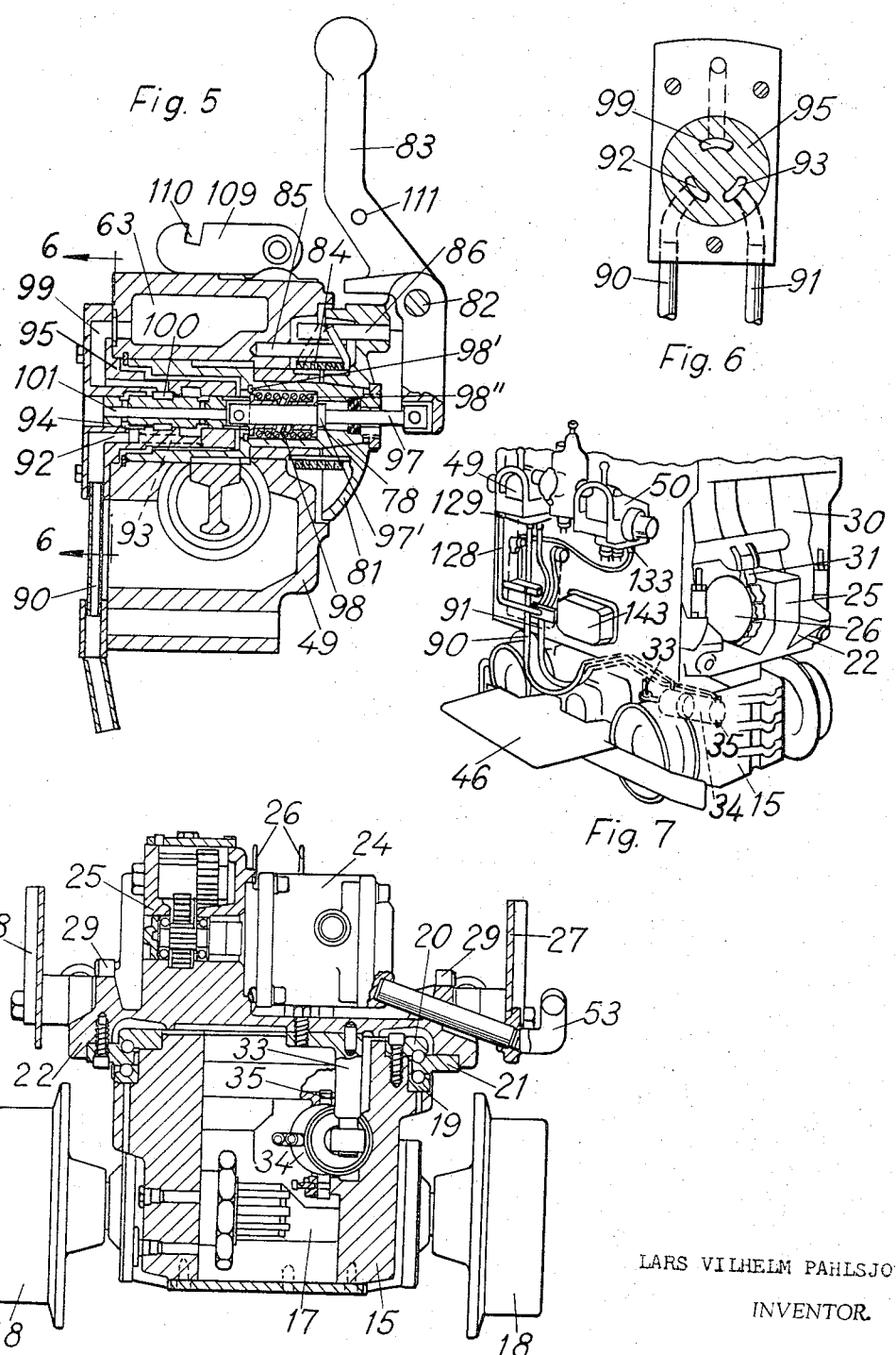

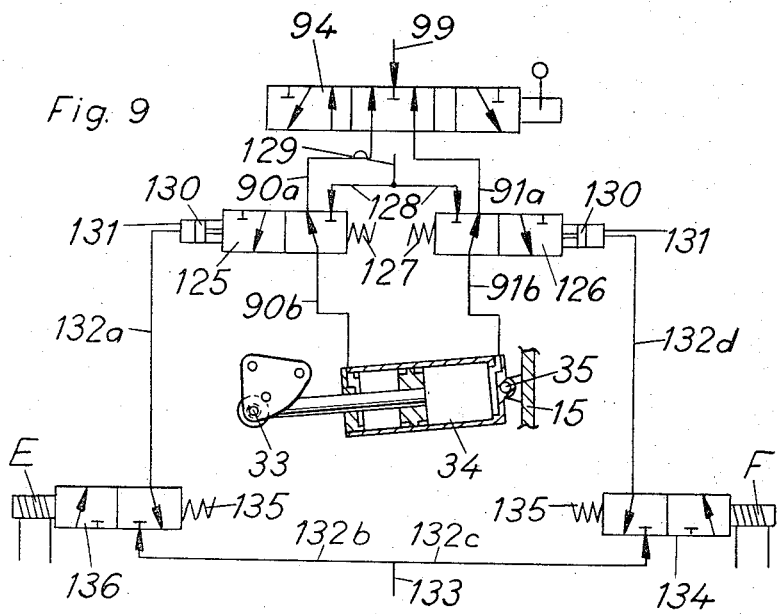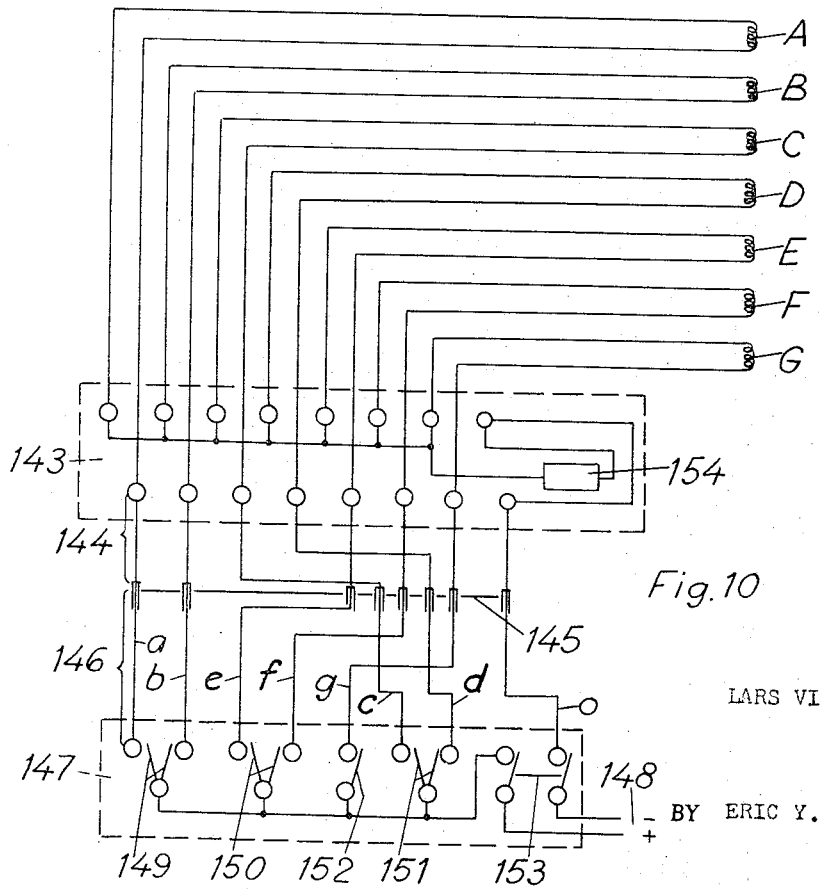

Aug. 15, 1967 L. V. PAHLSJÖ 3,335,881
REMOTELY CONTROLLED VEHICLES FOR PERFORMING MINING WORK
Filed April 13, 1965 6 Sheets-Sheet 5

LARS VILHELM PAHLSJO
INVENTOR.

BY ERIC Y. MUNSON,
Attorney

United States Patent Office 3,335,881
Patented Aug. 15, 1967

3,335,881
REMOTELY CONTROLLED VEHICLES FOR
PERFORMING MINING WORK
Lars Vilhelm Pahlsjö, Örebro, Sweden, assignor to Atlas
Copco Aktiebolag, Nacka, Sweden, a corporation of
Sweden
Filed Apr. 13, 1965, Ser. No. 447,673
11 Claims. (Cl. 214—131)

This invention relates to mobile vehicles for performing mining or other work under the action of pressure fluid. Operation of mechanized pressure fluid driven machinery particularly underground is often hazardous to the operator because of the heavy character of the work, the usually restricted space at the working face, bad illumination and visibility, and the danger of pieces of the surrounding rock becoming loose and falling down. It is therefore the main object of the invention to provide a remote control for pressure fluid powered vehicles whereby their work can be effectively and fully controlled by the operator from a position separate from the vehicle according to the operators own choice and suitable to minimize the personal risks. Another object of the invention is to provide an efficient remote control for mobile vehicles incorporating at least one rotary reversible pressure fluid driven motor and control means therefor on the vehicle. A further object of the invention is to provide an efficient remote control for mobile vehicles incorporating at least one reciprocating pressure fluid driven cylinder and piston motor and control means therefor on said vehicle. A still further object of the invention is to provide a control valve device for pressure fluid operated mechanisms in which there are provided servo motor means making possible effective remote control of the valve device.

For the above and other purposes there is provided in a mobile vehicle for performing work under the action of pressure fluid, a working unit supported on said vehicle for performing said work, a pressure fluid driven motor drivingly connected to said working unit, a pressure fluid line for supplying pressure fluid to said motor, control valve means in said line and on said vehicle for controlling operation of said motor, a servo circuit on said vehicle in communication with said power line, pressure fluid actuated servo motor means in said servo circuit connected to said valve means for movement thereof to control operation of said motor depending on pressure conditions in said servo circuit, solenoid valve means in said servo circuit for conditioning the pressure in said servo circuit in response to actuation of said solenoid valve means, and an electric control circuit coupled to said solenoid valve means for the actuation thereof from a position remote from said vehicle.

The above and other objects of the invention will become obvious from the following description and from the accompanying drawings in which an embodiment of the invention is illustrated by way of example. It should be understood that this embodiment is only illustrative of the invention and that various modifications may be made within the scope of the claims.

Figure 2:
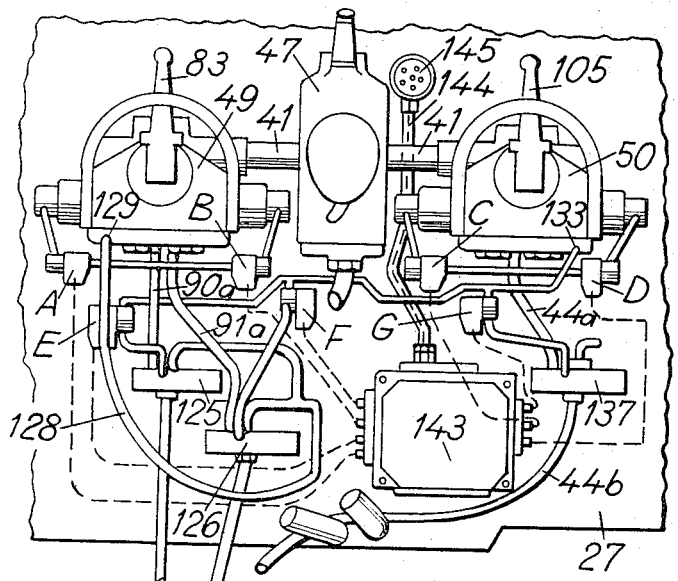
Figure 3:
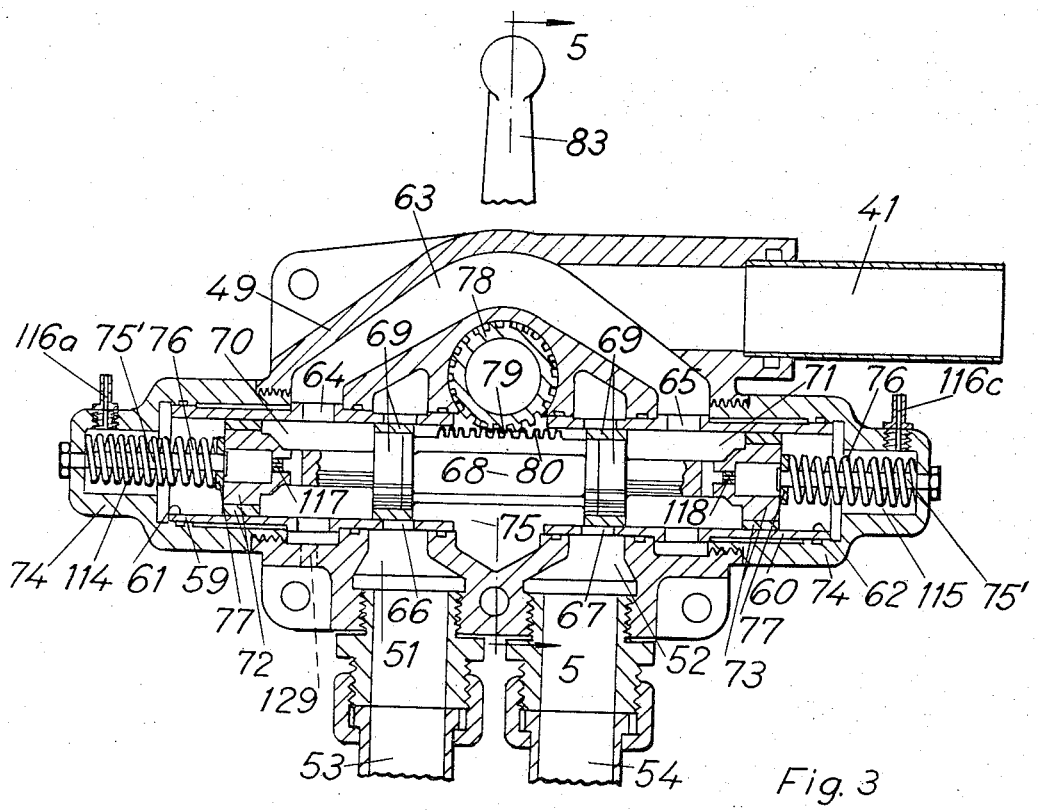
Figure 4:
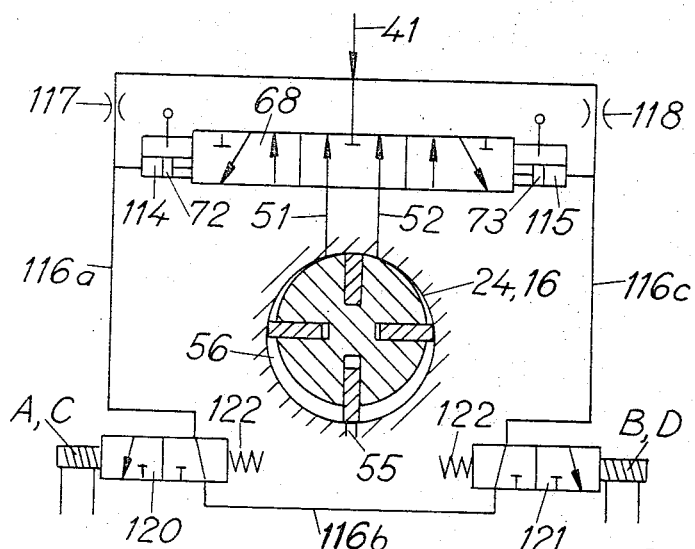
Figure 11:
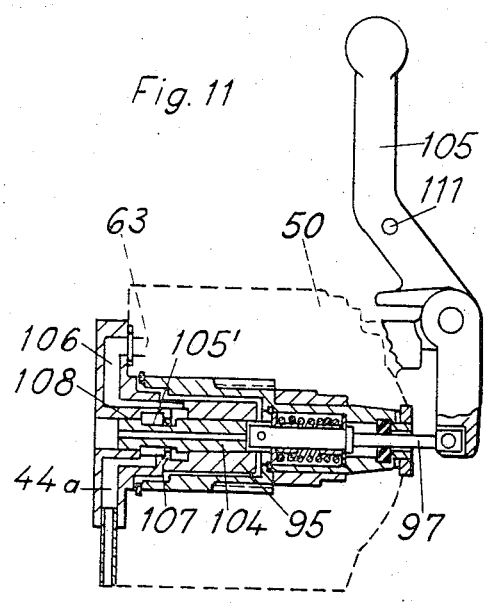
Figure 12:
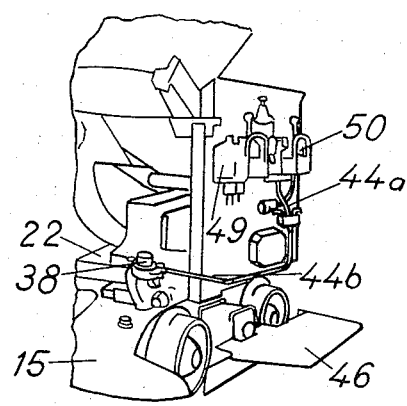
Figure 13:
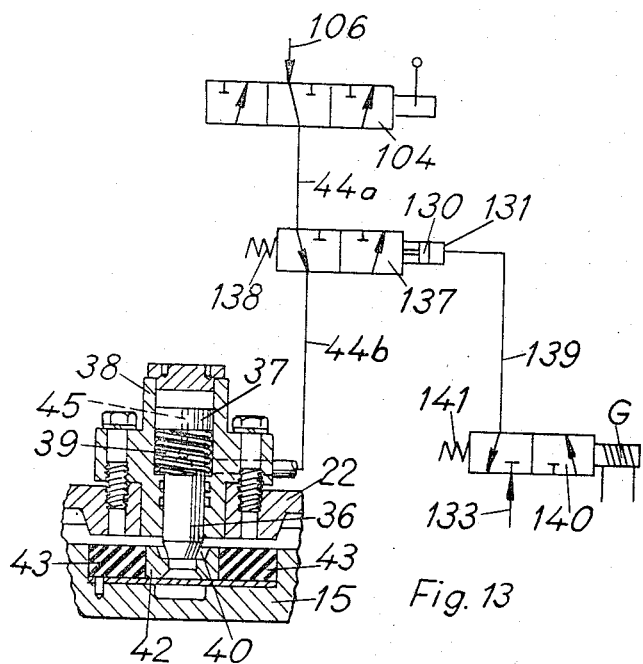
Figure 14:
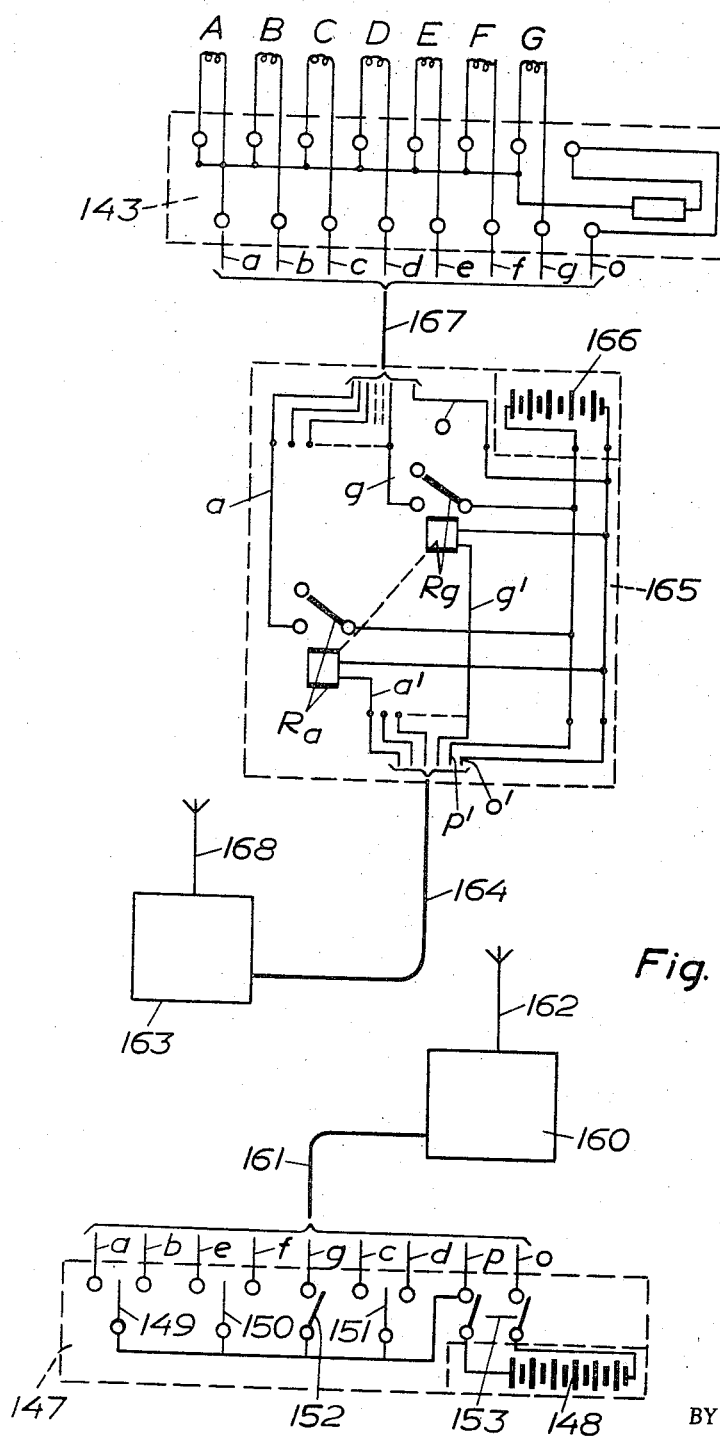

In the figures, FIG. 1 shows a perspective view of a remotely controlled compressed air powered machine according to the invention. FIG. 2 is a plan view of the valve arrangement on one of the side plates of the machine in FIG. 1. FIG. 3 is a longitudinal sectional view through the left hand control valve in FIG. 2. FIG. 4 is a diagrammatic presentation of the operating circuitry for the control valves in FIG. 2. FIG. 5 is a cross sectional view on line 5—5 in FIG. 3. FIG. 6 is a sectional view on line 6—6 in FIG. 5. FIG. 7 is a fragmental perspective rear view of the machine in FIG. 1 illustrating the operating system for turning the working frame of the machine. FIG. 8 is a central cross sectional view through the lower portion of the machine in FIG. 1. FIG. 9 is a diagrammatic presentation of the operating circuitry for the turning means in FIGS. 7 and 8. FIG. 10 shows diagrammatically the electric circuitry of the remote control of all the solenoid valves included in the various operating circuits of the machine. FIG. 11 is a fragmental cross sectional view through the right hand control valve in FIG. 2. FIG. 12 is a fragmental perspective front view of the machine in FIG. 1 illustrating the operating system for centering the working frame of the machine. FIG. 13 is a fragmental longitudinal cross sectional view through the centering means in FIG. 12 and a diagrammatic presentation of the operating circuitry for the locking piston included therein. FIG. 14 shows diagrammatically and in simplified presentation a portion of a modified electric remote control circuit in which the cable portion in FIG. 10 has been replaced by a radio command transmission system.

In the illustrative embodiment of the invention the remote control is by way of example associated with a material handling vehicle commonly known as a shovel loader for loading loose rock from a mine floor into a mine car or other receptacle, although obviously the present remote control system may be associated with other kinds of mining or other vehicles powered by pressure fluid.

The loader shown in the figures includes a wheeled traction unit 15 provided with a pressure fluid driven reversible traction motor 16 of the rotary van type. Through suitable conventional gear transmission, not shown, provided in the unit 15, the motor 16 is drivingly connected to one of the wheel axles 17, which support the unit 15 on flanged wheels 18. By rotation of the motor 16 in one direction or the other the traction unit 15 thus can be moved in forward or rearward direction along tracks, not shown, laid out on the mine floor.

Centrally and in a horizontal disposition on the traction unit there is provided an axial thrust ball bearing including upper and lower ball races 20, 19, FIG. 8, between which an intermediate ball race 21 is journalled. This intermediate race 21 carries a turntable frame 22 thereon so that it can pivot about the central vertical axis defined by the ball races 19–21.

Another reversible motor 24 of the rotary van type is affixed to a gear boss 25 forming part of the turntable frame 22. Through suitable conventional gear transmissions, not shown, in the gear box 25 the motor 24 is drivingly connected to a chain drum 26 carried by the box 25 at the rear end of the frame 22.

Between vertical opposed side plates 27, 28 on the frame 22 there are provided two rails 29 on which two rockers forming a rocker structure 30 are mounted for guided rolling movement, for which purpose a driving chain 31 is connected between the rocker structure 30 and the chain drum 26. By rotating the motor 24 in one direction the chain 31 is wound on the drum 26 moving a shovel 32 connected to the outer end of the rocker structure 30 from a lowered material digging position, FIG. 1, to a raised material dumping position, not illustrated. The chain 31 is paid out from the drum 26 by rotating the motor 24 in opposite direction, whereby the rocker structure 30 and shovel 32 are returned by their own weight to the digging position. To the underside of the turntable frame 22 is connected a downwardly pointing pin 33 which is disposed excentrically with respect to the turning axis of the frame 22. To the pin 33 is pivotally connected the piston rod end of a double acting pressure fluid driven power cylinder 34. FIGS. 7 and 8, the opposite cylinder end of which is journalled pivotally on an axle 35 inside of the traction unit 15. The pin 33 and the axle 35 are disposed in such manner that the turntable frame 22 can be turned angularly for turning the shovel 32 to one side or the other of the traction unit 15 by respective extension or contraction of the power cylinder 34.

A locking pin 36 is provided for purposes of centering the turntable frame 22 in the longitudinal vertical center plane of the traction unit 15. The locking pin 36 forms the piston rod in a piston 37 which is slidable in a cylinder 38, FIGS. 12 and 13, affixed to the frame 22 in vertical position thereon. A spring 39 bears against the lower end of the cylinder 38 and against the underside of the piston 37 and serves for the retraction thereof and of the locking pin 36 with respect to the cylinder 38. A supply conduit 44b communicates with the lower end of the cylinder 38 and via a passage 45 in the piston 37 with the upper end thereof and when pressure fluid is supplied thereto the locking pin 36 is urged in downward direction sliding on the upper surface of the unit 15 while the frame 22 being turned. When the turntable frame 22 during its turning motion reaches the central position thereof on the unit 15 a locking recess 40 provided on the unit 15 receives the outer end of the locking pin 36 and stops further turning. The recess 40 is provided in a bracket 42 supported between rubber buffers 43 on the traction unit 15. The buffers 43 are provided for cushioning the inertial forces when the frame 22 is immobilized. Venting of the conduit 44b relieves the pressure in the upper portion of the cylinder 38 so that the spring 39 can lift the locking pin out of the recess 40 whereby turning of the frame 22 is again possible.

For the direct manual control of the motors 16, 24 the power cylinder 34 and the piston 37 there are provided control valves on the side plate 27 of the turntable frame 22. Hereby the vehicle in well-known manner can be manoeuvered by an operator standing on a side platform 46 carried by the traction unit 15. Centrally on the plate 27 there is provided a conventional main valve and lubricator unit 47, not shown in detail, to which pressure fluid such as compressed air is supplied through a flexible hose 48 from some suitable outer source, not shown. Transversely to the upper portion of the lubricator unit 47 there are connected a pair of tubes 41 leading respectively to a left hand and a right hand control valve housing 49 and 50. Except for the position of the tubes 41 the valve housings 49, 50 are of substantially identical construction and it is therefore deemed sufficient to describe only one of them in detail. In the lower portion of the valve housings 49, 50 there are provided a pair of air delivery passages 51, 52, FIG. 3, which in the left hand control housing 49 are connected by conduits 53, 54 to the shovel operating motor 24 on the turntable frame 22 as diagrammatically depicted in FIG. 4. The conduits 53, 54 are in communication each with one of the opposite halves of the motor cylinder 56 upstream of the motor exhaust opening 55, and the motor 24 can thus be rotated bidirectionally as a result of live pressure being supplied to one or the other of the conduits 53, 54. The delivery passages 51, 52 in the right hand control valve housing 50 are connected in analogous manner by means of conduits 58, 57 to the motor cylinder 56 of the traction motor 16.

In the valve housing 49 (or 50) there are provided a pair of longitudinally spaced sleeves 59, 60 having coaxial bores 61, 62 therein. In the housing 49 the supply tube 41 communicates with a branched supply passage 63 which is connected to the coaxial bores 61, 62 through radial openings 64 and 65 in the respective sleeves 59, 60. The delivery passages 51 and 52 are in communication with an inner portion of the respective bores 61, 62 through radial openings 66, 67 in the sleeves 59, 60. Centrally between the sleeves 59, 60 there is provided a venting chamber 75 in the housing 49 communicating with the atmosphere through a sound muffling passage, not shown.

A valve body 68 traverses the chamber 75 and carries opposed lands 69 thereon slidably each in one of the bores 61, 62. In axially outwardly spaced relation to the lands 69 the valve body 68 also carries a pair of servo pistons 72, 73 connected thereto by means of intermediate piston rod portions of reduced diameter. The servo pistons 72, 73 are received each in one of the bores 61, 62 with a sliding fit. Between each servo piston 72 and 73 and the land 69 adjacent thereto there are enclosed a pair of opposed high pressure chambers 70, 71 in the bores 61, 62 which chambers are supplied with live pressure via the openings 64 and 65. Cover caps 74 are affixed to the opposite ends of the housing 49 in coaxial relation and receive tightly therein the outer ends of the sleeves 59, 60. Through each cap 74 is threaded an adjustable screw spindle 75' supporting a spring 76 therearound and in compression between an inner wall portion of the cap 74 and a washer 77 slidable on the inner end of the spindle 75'. The two washers 77 and springs 76 act against the opposed outer faces of the servo pistons 72, 73 tending to move the valve body 68 to the neutral position depicted in FIG. 3, in which the high pressure chambers 70, 71 both are closed by the lands 69 with respect to the openings 66, 67 of the two delivery passages 51, 52. In this neutral position the lands 69 also keep the openings 66, 67 open to the venting chamber 75 so that the vane motor cylinders 56 are fully vented via the conduits 51, 52 and 56, 57 and the exhaust passage 55. This allows the motors 16, 24 to rotate freely during idle movements of the wheels 18 and lowering of the shovel 32.

Adjacent the venting chamber 75 a hollow shaft 78 is rotatably journalled in the valve housing 49 (and 50). The shaft 78 has gear teeth 79 thereon which are in mesh with corresponding teeth on a rack 80 provided on the central portion of the valve body 68. As shown in FIG. 5 the shaft 78 carries fixedly at one end thereof a circular bracket 81 on the upper portion of which are formed ears carrying a transverse pivot 82. About the pivot 82 an upwardly pointing handle 83 is pivotable in a plane through the turning axis of the shaft 78. By turning of the handle 83 in directions parallel with the pivot 82 the bracket 81 and the shaft 78 can be turned.

When the handle 83 is turned to the left in FIG. 3, the valve body 68 is moved to the right by the gear 79 and rack 80 compressing the right hand spring 76 in front of the servo piston 73. Hereby the left hand high pressure chamber 70 is connected to the delivery passage 51, the adjacent land 69 closing the communication between the openings 66 and the venting chamber 75 at the inner end of the bore 61. Simultaneously the right hand land 69 maintains the venting communication between the delivery passage 52 and the venting chamber 75. Such fluid distribution in the valve housing 49 corresponds to displacement of the valve body to the right in the diagrammatic view in FIG. 4 which obviously produces counterclockwise rotation of the shovel motor 24 or the traction motor 16 when viewed in FIG. 4. In full analogy herewith turning of the handle 83 to the right in FIG. 3 moves the valve body 68 to the left in FIGS. 3 and 4 against the action of the left hand spring 76 and connects the right hand high pressure chamber 71 with the delivery passage 52 while maintaining venting of the delivery passage 51 via the venting chamber 75. The vane motor 24 or 16 will now obviously be rotated in clockwise direction when viewed in FIG. 4.

The opposed springs 76 are assisted in their action to move the valve body 68 to neutral position by a torsion spring 84 wound around the shaft 78 at the base of the bracket 81 and compressing between its opposite spring ends a fixed pin 85 carried fixedly by the housing 49 and a return pin 86 fixed to the bracket 81.

In the control valve housing 49 there is also provided a manually operable control valve 94, FIG. 5, for the operation of the power cylinder 34 which turns the turntable frame 22. To this end the opposite ends of the power cylinder 34 are connected by means of conduits 90, 91 to delivery passages 92, 93 which in the neutral position of the control valve 94, FIGS. 5 and 9, both are vented to the atmosphere. As shown in FIG. 5 the valve 94 is slidably mounted in a valve block 95 affixed to the rear portion of the valve housing 49 and extending with a cylindrical portion thereon into the hollow shaft 78. The lower end of the handle 83 is connected by means of a link 97 to one end of the control valve 94 so that turning of the handle 83 about the pivot 82 causes axial movement of the valve 94 in the block 95. The control valve 94 is maintained in neutral position by a spring 98 bearing against opposed inner abutments 98', 98" in the shaft 78. As soon as the control valve 94 by pushing or pulling the handle 83 is moved to the right or to the left from its neutral position, the spring 98 is compressed between one or the other of these inner abutments 98', 98" on the one hand and a shoulder 97' on the link 97 or the inner end face of the valve 94 on the other hand. By compression of the spring 98 the control valve 94 is urged back to neutral position.

The supply passage 63 in the control valve housing 49 communicates via a passage 99 in the valve block 95 with an intermediate annular recess 100 on the valve 94 which recess 100 in FIG. 5 is closed with respect to the delivery passages 92, 93 by opposed partitions in the valve block 95. In this position the delivery passages 92, 93 are vented to the atmosphere via radial passages and a central axial bore 101 in the control valve 94. When the control valve 94 is moved to the left or the right the central recess 100 therein connects the supply passage 99 with the delivery passage 92 or 93, respectively, while simultaneously keeping the other delivery passage, 93 or 92, vented via the bore 101. Hereby alternate pressurizing and venting takes place of the conduits 90, 91 producing extension or contraction of the power cylinder 34 at the operators will.

In the right hand control valve housing 50 the inner control valve 104, FIG. 11, which by means of the link 97 is connected to the operating handle 105 of the valve housing 50, controls pressure fluid flow through the conduits 44a and 44b through which pressure fluid is supplied to the cylinder 38, FIGS. 12, 13. The conduit 44a, b is connected to the supply passage 63 in the housing 50 by means of a short passage 106 which is in communication with the conduit 44a in the neutral position of the valve 104, FIGS. 11, 13, via an annular recess 105' provided on the valve 104. By pushing or pulling the handle 105 the valve 104 and its recess 105' are displaced to the right or to the left closing the passage 106 at an inner partition 107 in the valve block 95 and opening the conduit 44a to the atmosphere past a rear partition 108 in said block 95. Hereby obviously the desired full manual control of the locking pin 36 is achieved.

A link 109 pivotally connected to the upper end of both control valve housings 49, 50 can be pivoted to engage by means of a notch 110 thereon a pin 111 provided on the handles 83 and 105. Hereby the handles can be locked in neutral safety position.

For improving the control of the present vehicle over the above described manual control, a remote control system is added thereto giving the operator a free choice of position during control. In the valve housings 49, 50 the caps 74 provide actuating chambers 114 and 115 therein adjacent the respective servo pistons 72 and 73. The chambers 114 and 115 in each housing 49, 50 are interconnected by means of conduits forming a servo circuit 116a, 116b, 116c, FIG. 4, and are supplied with pressure fluid from the high pressure chambers 70, 71 via restricted bleed passages 117, 118 provided at the opposed ends of the valve body 68 and interconnecting the opposite faces of the respective servo pistons 72, 73. Between the circuit portions 116a, 116c and the circuit portion 116b there are coupled conventional solenoid valves 120, 121 illustrated diagrammatically in FIG. 4, which by springs 122 are urged to a normal position in which the servo circuit portions 116a–c are in communication with one another. The solenoids of the valves 120 and 121 are respectively designated A and B in the servo circuit for the housing 49 and C and D for the housing 50. When the solenoid A (or C) of the solenoid valve 120 is energized said valve 120 is moved against the action of the spring 122 to actuated position in which the circuit portion 116a is vented to the atmosphere while the portion 116b is closed. This vents the chamber 114 in the valve housing 49 (or 50) to atmosphere. Since the opposite chamber 115 remains pressurized there is created a pressure bias against the adjacent servo piston 73 moving the valve body 68 to the left in FIGS. 3 and 4 so that the motor 24 (or 16) starts to rotate in clockwise direction when viewed in FIG. 4.

When the solenoid A (or C) is deenergized the solenoid valve 120 is returned by its spring 122 to the normal position connecting the circuit portion 116b with portion 116a. Hereby the pressure in the portions 116b, c and in the chamber 115 will be rapidly lowered because of pressure equalization in the entire servo circuit and the return springs 76 and 84 in the valve housing 49 (or 50) can thus immediately return the valve body 68 to neutral position. Pressure fluid bleeding through the passages 117, 118 will thereupon restore the pressure in the chambers 114, 115 at opposite sides of the valve body 68.

Actuation of the solenoid B (or D) of the solenoid valve 121 causes in a similar manner the valve 121 to vent the chamber 115 via the circuit portion 116c and to maintain the pressure in the chamber 114 and the portions 116a, b. The high pressure in chamber 114 moves the valve body 68 to the right in FIGS. 3, 4 causing counterclockwise rotation of the motor 24 (or 16). As soon as energizing of the solenoid B (or D) is interrupted the spring 122 will return the solenoid valve 121 to normal position and the subsequent pressure equalization in the servo circuit will start a rapid return of the valve body 68 to normal position.

For the remote control of the power cylinder 34 there are included servo valves 125, 126 in the two conduits 90, 91 leading to the power cylinder 34. These servo valves 125, 126 divide the conduits 90, 91 in conduit portions 90a, 90b and 91a, 91b, FIG. 9. Springs 127 acting against the valves 125, 126 serve for keeping them in a normal position in which the conduits 90, 91 are open. In this position the servo valves also close the branched ends of a conduit 128, which receives live pressure from the valve housing 49 at a connecting point 129, FIGS. 2, 3, 7 in communication with the high pressure chamber 70 therein. To each valve 125, 126 there is connected a servo piston 130, slidable in a servo cylinder 131 provided in the housings of the valve 125, 126 and connected to a servo circuit consisting of four conduit portions 132a–d. Of these portions the conduits 132b, c are connected to receive live pressure from the valve housing 50 at a connecting point 133, FIGS. 2, 3, thereon in communication with the high pressure chamber 71. Between the conduits 132a and 132b as well as between the conduits 132d and 132c there are coupled solenoid valves 136, 134 which are urged to a normal position, FIG. 9, by springs 135. In this normal position the valves 136, 134 keep the conduits 132b and 132c closed while the conduits 132a, 132d are vented to the atmosphere. The valves 136, 134 can be moved to actuated position by solenoids E and F respectively.

When the solenoid E is energized the solenoid valve 136 is moved against the action of the spring 135 to actuated position interconnecting the conduits 132a and 132b whereby the servo cylinder 131 of the servo valve 125 is pressurized and the servo valve 125 moved to actuated position in which the conduit portion 90a is closed and the conduit 128 is connected to the conduit portion 90b. This pressurizes the piston rod end of the power cylinder 34 causing contraction of the power cylinder 34 since the opposite end of the cylinder 34 is open to the atmosphere via the conduit portions 91a, b. When the solenoid E is deenergized the solenoid valve 136 and the servo valve 125 are returned to their normal positions depicted in FIG. 9. Similarly, actuation of the solenoid F will connect the servo conduits 132c, 132d and pressurize the servo cylinder 131 of the servo valve 126 so that the servo valve 126 is moved to actuated position. Pressure fluid will thus be supplied from conduit 128 to conduit 91b causing extension of the power cylinder 34 since its piston rod end is vented via the conduit portions 90a, b. Deenergization of the solenoid F obviously again restores the position of the circuit depicted in FIG. 9.

For the remote control of the locking pin 36 and its piston 37 there is provided a servo valve 137 between the conduit portions 44a and 44b which is kept in a normal open position by a spring 138 acting thereagainst. A servo piston 130 is connected to the servo valve 137 and is slidable in a servo cylinder 131 provided in the housing of the valve 137. When the servo cylinder 131 is pressurized the servo piston 130 moves the valve 137 to actuated position in which the conduit portion 44a is closed and the conduit portion 44b vented to the atmosphere. A servo conduit 139 is connected to the servo cylinder 131 and communicates with a solenoid valve 140 which is urged to a normal position by a spring 141. In the normal position the solenoid valve 140 vents the servo conduit 139 to the atmosphere and closes a conduit connecting the valve 140 with the connection point 133 on the valve housing 50. A solenoid G is included in the valve 140 and moves, when energized, the valve 140 to actuated position against the action of spring 141. In actuated position the servo valve 140 connects the pressure fluid supply point 133 with the servo conduit 139 whereby the servo cylinder 131 is pressurized and moves the piston 130 and the servo valve 137 to the actuated position thereof for venting the cylinder 38 or the locking pin 36. Deenergizing of the solenoid G obviously restores the position of the circuit depicted in FIG. 13.

The solenoids A–G are coupled by leads indicated by dotted lines in FIG. 2 and diagrammatically in FIG. 10 to a coupling box 143 mounted on the side plate 27. A cable 144 containing all the leads to the solenoids A–G extends from the box 143 to a cable connector 145 on the plate 27. To the connector 145 can be coupled the cable terminal of a cable 146 which is connected to a portable control box 147 including a small power source such as a battery 148. On the control box 147 there is provided a shovel motor control three positions switch 149 having a neutral position and opposed actuating positions in contact with the leads a or b in which the respective solenoids A and B are energized. Similarly the box 147 has a traction motor control three positions switch 151 having a neutral position and opposed actuating positions in contact with the leads c or d in which the respective solenoids C and D are energized. Furthermore the box has a turning motor three position switch 150 for energizing the respective solenoids E and F via the respective leads e or f. Finally there is a locking pin control pushbutton 152 on the box 147 for energizing the solenoid G via the lead g and also a main switch 153 for connecting the potential of the battery 148 to act between the respective switches 149–152 and the negative lead o in the control box 147. In connection with the lead o there is provided a fuse 154 in the coupling box 143. The remote control of all the solenoids A–G is obvious from and can be followed in full detail in the circuit in FIG. 10 while the reactions of the various pressure fluid servo circuits to actuation of the solenoids in a manner to provide full control of the movements of the vehicle has been fully described above and need no further description.

If it is desired to apply the present remote control system to a steerable pressure fluid powered loading machine of similar design with the above described shovel loader but having rubber tires and running directly on the mine floor, the turning and centering mechanism, which then will be omitted, can be replaced respectively by a reciprocating or rotary steering motor and for example by a power cylinder for tipping of a transportation receptacle on the vehicle or for other purposes. These motors then obviously can be provided with control and servo circuits as described hereinabove and can thus also be fully controlled from a position remote from the vehicle. The cable for transmitting energizing signals to the solenoids can in conventional manner be replaced by a radio command system. Such an embodiment is indicated diagrammatically in FIG. 14, in which parts common with the circuit in FIG. 10 are designated by like numerals. In FIG. 14 the portable control box 147 has the battery 148 provided therein and the latter supplies power to a portable high frequency radio transmitter 160 via leads o, p in cable 161 which also includes the leads a–f from the control switches 149–152. In a manner well-known in the art and therefore not illustrated in detail, the transmitter 160 is adapted to react upon actuation of the switches 149–152 by radiating via the antenna 162 command signals, each corresponding to one of the actuated positions of each of the switches 149–152 or to suitable combinations of such positions.

On the side plate of the vehicle there is provided the coupling box 143 as before. Additionally thereto the side plate supports a high frequency radio receiver 163 which by a cable 164 is coupled to a relay box 165 in which is provided an electric battery 166. The relay box 165 and the negative lead o from the battery 166 are connected by a cable 167 to the control box 143. By means of leads o', p' the battery 166 also powers the radio receiver 163 via the cable 164.

The command signals radiated from the antenna 162 are sensed by the antenna 168 of the receiver 163, are amplified therein and in per se well-known manner caused to energize via leads a'–g' in the cable 164 one or more of the relays $R_a$–$R_g$ depending upon the character of the command signal received by the receiver 163.

If the receiver 163 for example receives the command signal corresponding to energizing of lead a by switch 149 in the control box 147, this will cause the receiver to energize lead a' in cable 164 so that the relay $R_a$ will be energized. The relay $R_a$ now closes the circuit through lead a via cable 167 and the coupling box 143 on to energize the solenoid A, whereby a certain conditioning of one of the pressure fluid servo circuits is caused, as fully described hereinabove. If as another example both lead f and lead g are energized by combined actuation of the switches 150 and 152, the receiver receives the corresponding specific command signal producing simultaneous energizing of relay $R_f$ (not shown) and $R_g$ so that leads f and g receive current and the solenoids F and G are energized. By choosing the necessary number of command signals to be transmitted one thus obviously receives full remote radio control of all the solenoids one by one or in the desired combinations.

What I claim is:

1. In a mobile vehicle for performing material handling operations under the action of pressure fluid, a traction unit for moving said vehicle, a first pressure fluid driven reversible motor drivingly connected to said traction unit for forward or reverse movement thereof, a shovel swingably mounted on said vehicle to swing in a vertical direction between a lowered material digging position and a raised material dumping position, a second pressure fluid driven reversible motor drivingly connected to said shovel for upward or downward movement thereof, a pressure fluid line connected to said vehicle for supplying pressure fluid to said motors, first and second adjustable control valves mounted on said vehicle and connected to said line and to said first and second motor, respectively, for controlling the direction of rotation of said respective first and second motor, servo pistons connected to each said control valves for the adjustment thereof, first and second servo circuits in communication with said line and connected to said respective servo pistons of said first and second control valve for independent adjustment of said first and second control valve in response to pressure conditions in said respective first and second servo circuit, solenoid valve means in both said servo circuits for conditioning the pressure therein in response to actuation of said solenoid valve means, and an electric control circuit coupled to said solenoid valves for the independent actuation thereof from a position remote from said vehicle.

2. A vehicle as set forth in claim 1 in which said electric control circuit includes a portable control unit separate from said vehicle having manually operable switch means therein and a cable connecting said switch means to said solenoid valve means on said vehicle.

3. A vehicle as set forth in claim 1 in which said electric control circuit includes a portable control unit having manually operable switch means therein and a radio transmitter coupled to said switch means for producing command signals in response to actuation of said switch means, a radio receiver on said vehicle for receiving said command signals, and a relay unit coupled to said receiver on said vehicle, said relay unit having relay means therein coupled to energize said solenoid valve means in response to said command signals received by said receiver.

4. A vehicle as set forth in claim 1 in which said shovel is provided on a turntable frame mounted on said traction unit to turn relative thereto about a vertical axis, a power cylinder and piston device connected between said traction unit and said frame for thus turning it in one direction or the other, a pair of conduits connecting the opposite cylinder ends of said power cylinder and piston device to said supply line, a pair of servo valves each in one of said conduits, said servo valves having a first position in which said conduits are closed to said supply line and a second position in which said conduits are open to said supply line, means for biasing said servo valves to said first position thereof, pressure fluid actuated servo motors connected to said servo valves for movement thereof to said second position upon actuation of said servo motors, servo conduits connecting said supply line with said servo motors for the actuation thereof, a solenoid valve in each said servo conduit for normally closing said servo conduit to said line, and remotely controlled means for selectively energizing and opening one or the other of said solenoid valves.

5. A vehicle as set forth in claim 4 in which there is provided a reciprocable locking pin on said frame, a locking recess on said traction unit for providing when in engagement with said pin, immobilization of said frame relative to said traction unit, a manoeuvering piston carrying said pin, spring means on said frame and engaging said piston for urging said pin out of said recess, a passage connecting said line with one end of said piston for moving said piston and pin towards said recess, a servo valve in said passage, said servo valve having a first position in which said line is connected to said piston and a second closed position for venting said one end of said piston, means for biasing said servo valve to said first position, a pressure fluid actuated servo motor connected to said servo valve for moving it to said second position upon actuation of said servo motor, a servo conduit connecting said line with said servo motor for the actuation thereof, a solenoid valve in said servo conduit for normally closing said servo conduit to said supply line, and remotely controlled means for energizing and opening said solenoid valve.

6. In a mobile vehicle for performing mining work under the action of pressure fluid, a traction unit for moving said vehicle, a turntable frame pivotally mounted on said traction units, a power cylinder and piston device connected between said traction unit and said frame for pivoting said frame in one direction or the opposite relative to said traction unit, a pressure fluid supply line connected to said vehicle, a pair of conduits connecting the opposite cylinder ends of said power cylinder and piston device to said supply line, a pair of servo valves each in one of said conduits, said servo valves having a first position in which said conduits are closed to said supply line and a second position in which said conduits are open to connected to said servo valves for movement thereof to said second position upon actuation of said servo motors, connected to said servo valves for movement thereof to said second position upon actuation of said servo motors, servo conduits connecting said supply line with said servo motors for the actuation thereof, a solenoid valve in each conduit for normally closing said servo conduit to said line, and remotely controlled means for selectively energizing and opening one or the other of said solenoid valves.

7. A vehicle as set forth in claim 6 in which there is provided a reciprocable locking pin on said frame, a locking recess on said traction unit for providing when in engagement with said pin, immobilization of said frame relative to said traction unit, a manoeuvering piston carrying said pin, spring means on said frame and engaging said piston for urging said pin out of said recess, a passage connecting said line with one end of said piston for moving said piston and pin towards said recess, a servo valve in said passage, said servo valve having a first position in which said line is connected to said piston and a second closed position for venting said one end of said piston, means for biasing said servo valve to said first position, a pressure fluid actuated servo motor connected to said servo valve for moving it to said second position upon actuation of said servo motor, a servo conduit connecting said line with said servo motor for the actuation thereof, a solenoid valve in said servo conduit for normally closing said servo conduit to said supply line, and remotely controlled means for energizing and opening said solenoid valve.

8. In a mobile vehicle for performing material handling operations under the action of pressure fluid, a traction unit for moving said vehicle, a first pressure fluid-driven reversible motor drivingly connected to said traction unit for forward or reverse movement thereof, a shovel swingably mounted on said vehicle to swing in a vertical direction between a lowered material-digging position and a raised material-dumping position, a second pressure fluid-driven reversible motor drivingly connected to said shovel for upward and downward movement thereof, a pressure fluid line connected to said vehicle for supplying pressure fluid to said motors, a pair of pressure fluid conduits connected to each motor for causing movement thereof in one direction or the other in dependence upon alternate pressurization and relief of said conduits, first and second slidable control valves on said vehicle connected each between said supply line and one pair of said pairs of conduits, said valves each having a first and a second control position for connecting said power line respectively to one or the other of said conduits in each pair and for the simultaneous relief of pressure in the conduit thus not connected to said line, means for biasing said valves from said control positions to a neutral position in which said valves close said line to said conduits, a duality of servo circuits communicating with said line, a pair of pressure fluid-actuated servo pistons in each servo circuit connected to the opposite ends of each of said valves for moving said valves respectively to said first or second control position thereof depending on different pressure conditions in said servo circuits, solenoid valve means in each servo circuit for conditioning the pressure therein to move said control valves independently to said first or second control position thereof in response to actuation of said solenoid valve means, and an electric control circuit connected to said solenoid valve means for the actuation thereof from a position remote from said vehicle.

9. A vehicle as set forth in claim 8, in which said servo pistons are slidably received in a pair of cylinder chambers at the opposite ends of said valves, bleed passages in communication with said supply line and connected to each of said cylinder chambers for feeding pressure fluid thereto at a restricted rate, said duality of servo circuits consisting of a pair of conduits interconnecting the respective pairs of said opposed cylinder chambers and said solenoid valve means being provided in said conduits for selectively venting one or the other of said opposed chambers for moving said valves connected to said servo pistons to said first or second control position.

10. A vehicle set forth in claim 9 in which there are provided two solenoid valves in each conduit adjacent to the respective opposed cylinder chambers, biasing means for urging both of said solenoid valves to a normal position in which communication between said opposed chambers through said conduit and solenoid valves is open, and said electric control circuit being coupled for selectively energizing and moving one or the other of said solenoid valves to an actuated position wherein said actuated solenoid valve opens the branch of said conduit leading to the adjacent cylinder chamber to the atmosphere and closes the other branch of said conduit.

11. A vehicle as set forth in claim 8, in which there are provided manually operable means on said vehicle in engagement with each control valve for independent manual displacement thereof to respectively said first and second position thereof.

References Cited

UNITED STATES PATENTS

| | | |
|---|---|---|
| 2,244,528 | 6/1941 | Schur. |
| 2,424,288 | 7/1947 | Severy. |
| 2,676,717 | 4/1954 | Engel _____ 214—132 |
| 2,796,685 | 6/1957 | Bensinger. |
| 2,826,402 | 3/1958 | Alspaugh et al. _____ 180—2 X |

FOREIGN PATENTS 727,788   4/1955   Great Britain.

HUGO O. SCHULZ, *Primary Examiner.*

UNITED STATES PATENT OFFICE
CERTIFICATE OF CORRECTION

Patent No. 3,335,881                               August 15, 1967

Lars Vilhelm Pahlsjö

It is hereby certified that error appears in the above numbered patent requiring correction and that the said Letters Patent should read as corrected below.

Column 10, line 6, after "open to" insert -- said supply line, means for biasing said servo valves to said first position thereof, pressurized fluid activated servo motors --.

Signed and sealed this 19th day of November 1968.

(SEAL)
Attest:

Edward M. Fletcher, Jr.

Attesting Officer

EDWARD J. BRENNER

Commissioner of Patents